United States Patent
Möller et al.

(10) Patent No.: US 7,761,717 B2
(45) Date of Patent: Jul. 20, 2010

(54) MEMORY DEVICE WITH DATA SECURITY IN A PROCESSOR

(75) Inventors: Peter Möller, Freiburg (DE); Zoran Mijovic, Freiburg (DE); Manfred Jünke, Gundelfingen (DE); Joachim Ritter, Lörrach (DE); Steffen Zimmermann, Freiburg (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 839 days.

(21) Appl. No.: 10/193,659

(22) Filed: Jul. 10, 2002

(65) Prior Publication Data

US 2003/0014653 A1    Jan. 16, 2003

(30) Foreign Application Priority Data

Jul. 10, 2001    (EP) .................................. 01116594

(51) Int. Cl.
- H04L 29/06 (2006.01)
- H04L 1/00 (2006.01)
- G06F 9/00 (2006.01)
- G06F 12/14 (2006.01)
- G06F 15/167 (2006.01)
- G06F 13/00 (2006.01)
- G06F 3/00 (2006.01)
- G06F 12/00 (2006.01)
- G06F 11/00 (2006.01)
- H04K 1/00 (2006.01)
- G08B 29/00 (2006.01)

(52) U.S. Cl. ........................... 713/189; 713/2; 713/150; 713/193; 380/255; 380/264; 726/34; 709/215; 710/31; 710/36; 710/38; 711/100; 711/153; 711/173; 714/9

(58) Field of Classification Search .................. 713/189
See application file for complete search history.

(56) References Cited

U.S. PATENT DOCUMENTS 5,081,675 A * 1/1992 Kittirutsunetorn .......... 713/190

(Continued)

FOREIGN PATENT DOCUMENTS

FR    2 797 966    8/1999

(Continued)

OTHER PUBLICATIONS

Newton, Harry, Newton's Telecom Dictionary, 1998, Telecom Books, 14th Edition, pp. 315 and 621.*

(Continued)

*Primary Examiner*—Aravind K Moorthy
(74) *Attorney, Agent, or Firm*—DLA Piper LLP (US)

(57) ABSTRACT

A memory device containing data to be protected is integrated with a microprocessor and includes a first and a second memory portion with different accessibilities. The integration of the memory device on the same integrated circuit (IC) or chip as the microprocessor permits a combination of protective hardware and software measures that are not possible with a memory device that is on a different IC than the microprocessor. The first memory portion holds an initialization program that also serves as a boot program during decryption, and the second memory portion holds a user program, for example, a program for decrypting and/or decoding received data. Such data may be, for example, audio data encoded according to the MP3 standard and encrypted with a secret or public password against unauthorized reception.

16 Claims, 4 Drawing Sheets

U.S. PATENT DOCUMENTS

| | | | | |
|---|---|---|---|---|
| 5,442,704 | A | * | 8/1995 | Holtey .................. 711/163 |
| 5,826,007 | A | | 10/1998 | Sakaki et al. ......... 395/183.18 |
| 5,890,199 | A | * | 3/1999 | Downs .................. 711/106 |
| 6,112,304 | A | * | 8/2000 | Clawson ................ 713/156 |
| 6,181,605 | B1 | * | 1/2001 | Hollmer et al. ....... 365/185.22 |
| 6,185,686 | B1 | * | 2/2001 | Glover .................. 713/190 |
| 6,223,284 | B1 | * | 4/2001 | Novoa et al. .......... 713/100 |
| 6,272,637 | B1 | * | 8/2001 | Little et al. ........... 713/194 |
| 6,308,256 | B1 | * | 10/2001 | Folmsbee ............... 712/209 |
| 6,708,273 | B1 | * | 3/2004 | Ober et al. ............. 713/189 |
| 6,754,784 | B1 | * | 6/2004 | North et al. ............ 711/145 |
| 6,874,139 | B2 | * | 3/2005 | Krueger et al. ........ 717/127 |
| 7,085,385 | B2 | * | 8/2006 | Frantz et al. ........... 380/277 |
| 2002/0194389 | A1 | * | 12/2002 | Worley et al. .......... 709/310 |
| 2003/0056107 | A1 | * | 3/2003 | Cammack et al. ...... 713/189 |
| 2005/0114687 | A1 | * | 5/2005 | Zimmer et al. ......... 713/193 |
| 2006/0107032 | A1 | * | 5/2006 | Paaske et al. ........... 713/2 |
| 2006/0208066 | A1 | * | 9/2006 | Finn et al. .............. 235/380 |
| 2006/0242465 | A1 | * | 10/2006 | Cruzado et al. ........ 714/30 |
| 2007/0198856 | A1 | * | 8/2007 | Lee et al. ............... 713/190 |
| 2007/0260836 | A1 | * | 11/2007 | Rudelic ................. 711/163 |
| 2008/0140967 | A1 | * | 6/2008 | Breslau et al. .......... 711/163 |
| 2008/0155257 | A1 | * | 6/2008 | Werner et al. .......... 713/168 |
| 2008/0263363 | A1 | * | 10/2008 | Jueneman et al. ...... 713/184 |
| 2009/0125997 | A1 | * | 5/2009 | Cook ..................... 726/6 |

FOREIGN PATENT DOCUMENTS

| | | |
|---|---|---|
| FR | 2797966 | 8/1999 |
| JP | 08-016529 | 6/1994 |
| JP | 2000-076135 | 8/1998 |
| JP | 2000-172810 | 12/1998 |
| JP | 11-272560 | 8/1999 |
| WO | WO 00/75759 | 12/2000 |

OTHER PUBLICATIONS

Decision of Rejection mailed on Oct. 6, 2009 in connection with the related Japanese Patent Application No. 2002-195895, pp. 5-6. (English and Japanese Translations).

Notice of Reasons for Rejection mailed on Dec. 2, 2008 in connection with the related Japanese Patent Application No. 2002-195895, pp. 1-8. (English and Japanese Translations).

* cited by examiner

MEMORY DEVICE WITH DATA SECURITY IN A PROCESSOR

BACKGROUND OF THE INVENTION

This invention relates in general to the field of microprocessors, and in particular to the field of semiconductor devices that include a processor and a memory device with data security together on the same integrated circuit or chip. The invention supports the protection function of conventional encryption techniques using either public or secret keywords or passwords by preventing access to both the encryption program and the password stored in the associated memory device. These sensitive data are contained in a random-access memory incorporated onto the processor chip, such as an electrically writable and readable flash memory. This has the advantage that the contents of the random-access memory can be read not directly, but only indirectly via data interfaces.

Known externally accessible data interfaces include, for example, the standardized interfaces, such as Joint Test Action Group (JTAG), Universal Asynchronous Receiver/Transmitter (UART), or Universal Serial Bus (USB), all of which facilitate serial access. In the case of USB, the interface function is typically supported by specific programs in the processor and the interface function is also externally controlled and is completely independent of the processor. Also, relatively fast accesses are possible through parallel data interfaces which may also be dependent on or independent of the processor and be standardized or nonstandardized. For such parallel interfaces, as a rule, the function of a multitude of terminals is switched, so that 32-bit data and 32-bit addresses, for example, can be input or output in parallel.

If end users or third parties desire to gain knowledge of an encryption process without permission, they generally desire to access the contents of encrypted data. Such data may comprise stored or transmitted data. One example is the unauthorized transmission and reproduction of cost-chargeable pieces of music using the MP3 compression technique. Encryption of the data may prevent this to some extent, but the individual or global encryption program must remain secret for it to be effective. If there is relatively high interest in decryption of certain types of data, encryption bypass programs or decryption programs are typically quickly spread to the public through the Internet or other channels and thereby render the encryption ineffective.

What is needed is an improved technique for protection of data stored in a processor in conjunction with an encryption or decryption program. In particular, the encryption or decryption program is to be protected from unauthorized readout, alteration, or erasure. For authorized end users, however, program updates are desired to be possible at any time. It is preferred that the level of protection be predeterminable by the user and not by the manufacturer of the processor.

In what follows herein, encryption and decryption may be sometimes referred to together under the term "encryption" for simplicity. The term "user" as used herein indicates the person who buys the processor as a building block from the semiconductor manufacturer and incorporates it into an application-specific circuit to produce a device or apparatus. The device or apparatus is typically purchased and put into service, directly or as part of another device or apparatus, by an end user.

SUMMARY OF THE INVENTION

A memory device containing data to be protected is integrated with a microprocessor and includes a first and a second memory portion with different accessibilities. The integration of the memory device on the same integrated circuit (IC) as the microprocessor permits a combination of protective hardware and software measures that are not possible with a memory device that is on a different IC than the microprocessor. The first memory portion holds an initialization program that also serves as a boot program during decryption, and the second memory portion holds a user program, for example, a program for decrypting and/or decoding received data. Such data may be, for example, audio data encoded according to the MP3 standard and encrypted with a secret or public password against unauthorized reception. This decryption program may be identical to the relatively secure decryption program stored in the boot area or forms part of the user program in the second memory portion.

The first memory portion is programmable and modifiable via one or more external interfaces, but not via the processor or a data interface controlled by the processor. Through this, the processor cannot be caused by a program to read, alter, or destroy the contents of the initialization or boot program, which contains at least part of the encryption, decryption, or identification program. The basic function contained in the first memory portion may then be used to reload the user program in the second memory portion when that program becomes, for example, altered or destroyed.

The second memory portion is programmable and modifiable both via the external data interfaces and via the processor and the data interfaces controlled by the processor. Unpreventable access by the processor to the first and second memory portions is necessary both during normal operation and if the user provides for program updates by authorized end users. Such program updates are necessary at predeterminable intervals, for example, to alter the individual or group-related encryption program or password to limit the negative consequences of any accidental or illegal disclosure of the encryption technique. However, according to an aspect of the invention, inhibition or disabling that dispenses with program updates is also possible. In that case, the user disables all external interfaces (e.g., including those controlled by the processor) by setting a disable bit. In this case, the processor may have access to both the first and second memory portions for the normal sequence of operations.

The invention is highly flexible regarding its adaptation to the respective protection requirements of the user, and permits various types of applications, (e.g., consumer, professional, etc.). A conceivable consumer application may be, for example, the encrypted transmission of video or audio data. The authorized licensee or user can decrypt the data via the processor for subsequent processing in the processor or for reproduction, but cannot copy the decrypted data for third parties, because these data are not available at any externally accessible interface. The situation is similar if the engine in a motor vehicle is controlled by an electronic engine-management system whose proprietary program is to be protected from copying or modification.

The authorization or identity check may be made via the protected encryption program, which interacts with the public or nonpublic keyword stored in the first or second memory portion and with the program, received in encrypted form.

Only if all parts fit together will decryption, and as a result meaningful use of the received data or updating of the stored program be possible.

The second memory portion and, if necessary, the first memory portion are divided into different memory blocks so that block-by-block modification or erasure is possible during program updates to avoid conflicts between a new program and an old program stored there.

A first memory block in the first or second memory portion includes a protection control register containing programmable enabling or disabling information for each data interface to enable or disable reading from and/or writing to the first and second memory portions via this data interface. As long as the disabling information is not yet activated, the first and second memory portions are accessible via all external data interfaces, including those controlled by the processor. This permits an adaptation, modification, or debugging of the initialization or user program at the manufacturer or by the user. If, after completion of these modifications, the disable bits for the externally accessible data interfaces are set by the user, this cannot, as a rule, be cancelled by anyone without destroying the existing program. The first memory block with the disabling information contained therein is thus reliably protected from any modification. Users who identify themselves as authorized users via the existing software and the stored password can change the contents of the protection control register (i.e., they can cancel the inhibition or disabling). This allows the user to search for errors in the disabled processor if necessary.

Interrogation of the protection control register may take place upon power-up and may be accomplished through a hardwired function of the processor, before the initialization program permits other inquiries or programming operations. The hardwiring of these interrogations has the advantage that they are modifiable neither intentionally nor accidentally by any program. Also, the interrogation of the protection control register cannot be bypassed even for a short period of time when the power is turned on or interrupted.

A second and a third memory block in the first or second memory portion store the public or private keyword in a redundant manner. The keyword, which may also be referred to as a password, may be linked to the encryption program in the first and/or second memory portions. Whether the user prefers protection with a publicly accessible or publicly inaccessible (i.e., private or secret) keyword is dependent on the protection required. The advantages and disadvantages of the two types of access are not changed by the invention, but for both types access to the protected data contents is prevented or at least made much relatively more difficult.

A fourth, relatively large memory block in the second memory portion stores a user program. This program is typically replaced in the event of a program update. The contents of the user program in conjunction with the password permit the processor to decrypt and decode the received data. The protection from unauthorized access can be used not only at the decrypting end but also at the encrypting end.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
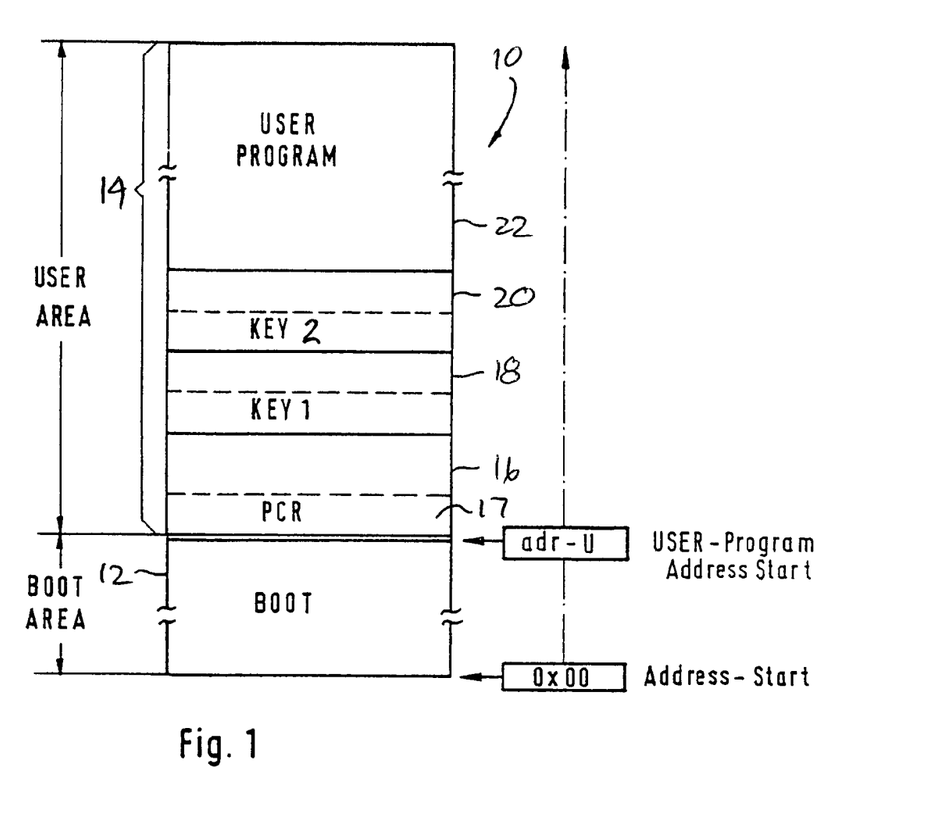
FIG. 1 is a pictorial illustration of the partitioning of a memory device integrated onto a processor chip.
Figure 5:
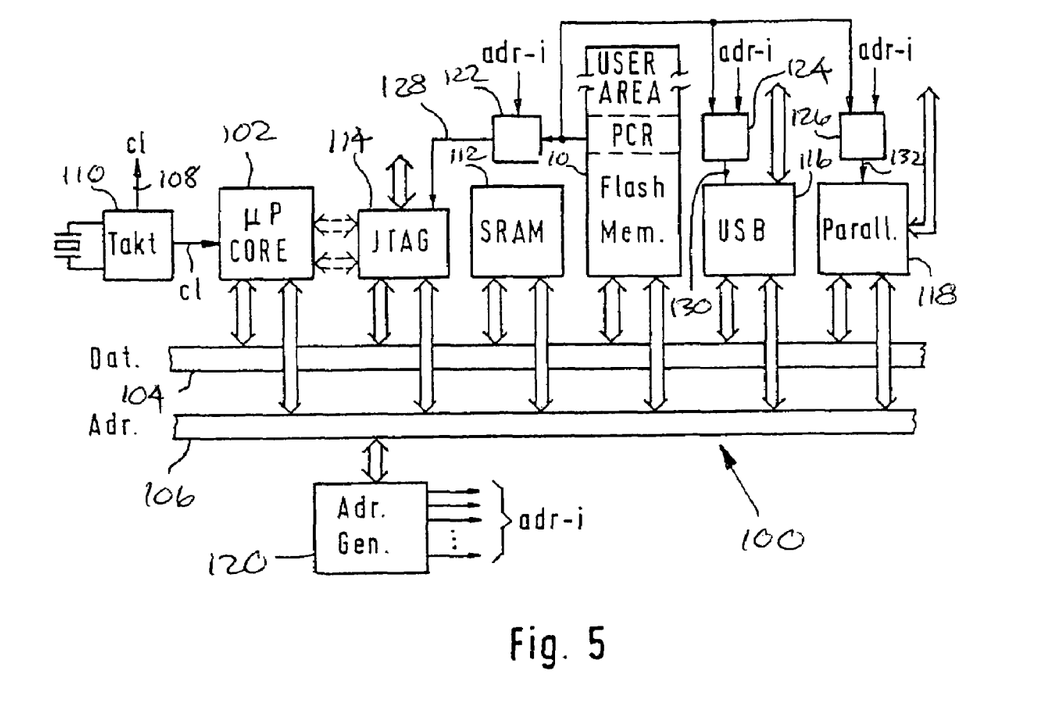
FIG. 5 a block diagram illustration of a processor and a memory device with data security together on the same chip.

FIG. 1 illustrates the partitioning of a memory device 10 incorporated on a semiconductor chip or integrated circuit (IC). The chip also includes a processor 100 (FIG. 5). The memory device 10 may be partitioned into a plurality of memory portions 12, 14. For example, the memory device 10 may be partitioned into a first memory portion 12 and a second memory portion 14. The first memory portion 12, which may begin with start address 0x00, contains an initialization or boot program. For programming purposes, the first memory portion 12 may provide for limited access thereto by the user and manufacturer, for example, by those data interfaces which are independent of the operation of the processor 100 (FIG. 5). During the manufacturing process, facilitated access to the first memory portion 12 may be possible via subsequently inaccessible chip contacts to load the initialization or boot program.

The initialization or boot program may be activated when the processor 100 (FIG. 5) is switched on. The initialization or boot program may also include executable routines that check the authenticity or identity of the user or end user, and may support read and write operations to the data interfaces controlled by the processor 100. The initialization or boot program may also include at least those parts of a decryption program that are necessary to reprogram the second memory portion 14 with the help of the processor 100 when the second memory portion 14 is empty or faulty, for example, by inputting the encrypted new program via a data interface controlled by the processor 100.

Figure 2:
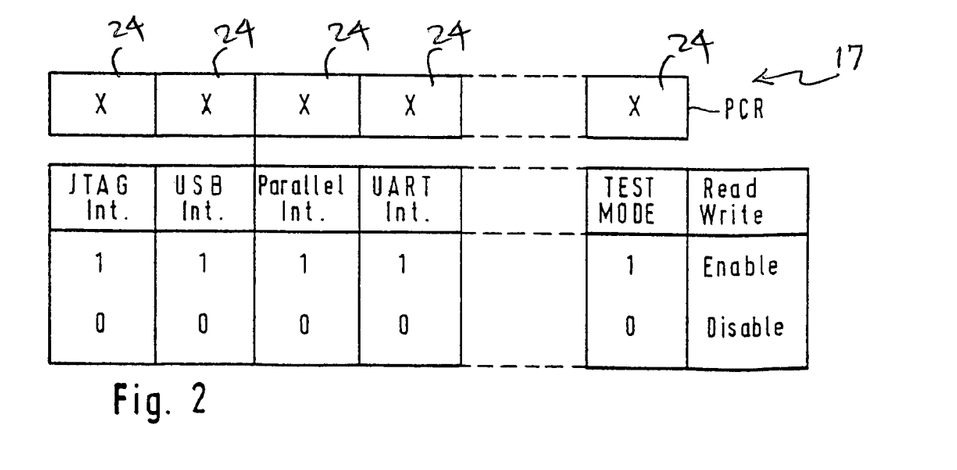
FIG. 2 is a pictorial illustration of a protection control register of the memory device of FIG. 1 with memory locations for various interfaces.

The first memory portion 12 may be followed by the second memory portion 14 (i.e., the user area), which contains the user program and whose addresses are assigned to the memory blocks contained therein and begin with the user start address adr-U. A first memory block 16 within the second memory portion 14 may include a protection control register (PCR) 17 that contains the enabling or disabling information for the individual data interfaces. FIG. 2 illustrates the PCR 17 in more detail. Additional memory space may be available in the first memory block 16 for further storage of data.

The first memory block 16 may be followed by second and third memory blocks 18, 20, respectively, which contain the keywords or passwords "Key 1" and "Key 2", respectively. These passwords, which are assigned to the end user or the end user group, are identical and are present in separately erasable areas so that at least one valid password is always present during reprogramming. Without this password, decryption of the received data is not possible. During reprogramming, the existing password is replaced by the new password in the second and third memory blocks 18, 20 at different control sections. The second and third memory blocks 18, 20 may be large enough to store additional passwords for other encryption programs if necessary.

The user program may be stored in a fourth memory block 22, which may be large enough to store current and future user programs. The different levels of access or ultimately the desired inhibition or disabling of the first and second memory portions 12, 14 may be controlled by hardware using the block addresses. For instance, the programming signal of the processor 100 (FIG. 5) may be logically combined with the area signal for the first memory portion 12 in such a way that the global enable signal or memory block enable signal for the memory device 10 is not formed. If, however, the first memory portion 12 is addressed in connection with a data interface that is independent of the processor 100, the global or memory block enable signal will not be suppressed unless the associated disabling signal in the PCR register 17 is set. In a similar manner, the first through fourth memory blocks 16, 18, 20, 22 in the second memory portion 14 are controlled by combining the block addresses or address-range signals with signals for reading from or writing to the memory device 10 and the associated data interface.

In the embodiment of FIG. 1, the memory blocks 16, 18, 20 are associated with the second memory portion 14. In this manner, a relatively high level of flexibility of the protection facility may be achieved, because a change of the access authorization or the password is possible by reprogramming (i.e., updating). If the protection control register 17 or the memory blocks 18, 20 for the passwords Key 1, Key 2 are located instead in the first memory portion 12, then reprogramming via the processor 100 is generally not possible and the access authorization and the password may be permanently fixed by the programmed data. This way protection against unauthorized read access is preserved, because the electronic inhibition or disabling of the externally accessible data interfaces does not permit data to be read.

Referring to FIG. 2, the protection control register 17 in the first memory block 16 is illustrated in more detail. For each external data interface (e.g., JTAG, USB, UART), the protection control register 17 has a bit location 24 for storing a logical "1" ("enabled") or "0" value ("disabled"). This enables or disables the reading from or writing to the memory device 10 via the associated data interface. The enabled condition of a bit 24 does not invalidate the predetermined possibilities of access, for example that the first memory portion 12 is never accessible via the data interfaces controlled by the processor 100. The choice of access depends on the respective technology used for the memory device 10. In flash memories, all bits 24 are in the logical "1" state after erasure, so that for this memory type, the logical "1" state is chosen as the enabling signal. Accordingly, a logical "0" represents a disabling signal for the read, write, and erase operations. At startup, each bit 24 of the PCR register 17 sets a corresponding "1" or "0" state in a state machine of the processor 100 when the power is turned on. In the alternative, the PCR register 17 may already be serving as a status register via permanently connected output read lines. During operation, the contents of such a status register are typically changed either by a change in the contents of the protection control register 17 or by power-down condition of the processor 100. A change in the status register contents in the on-state is typically possible from the "1" state to the "0" state, depending on the contents of the PCR register 17. The change in the other direction is generally not possible, because the disabling signal "0" disables access to the protection control register 17 via the externally accessible data interface.

Figure 3:
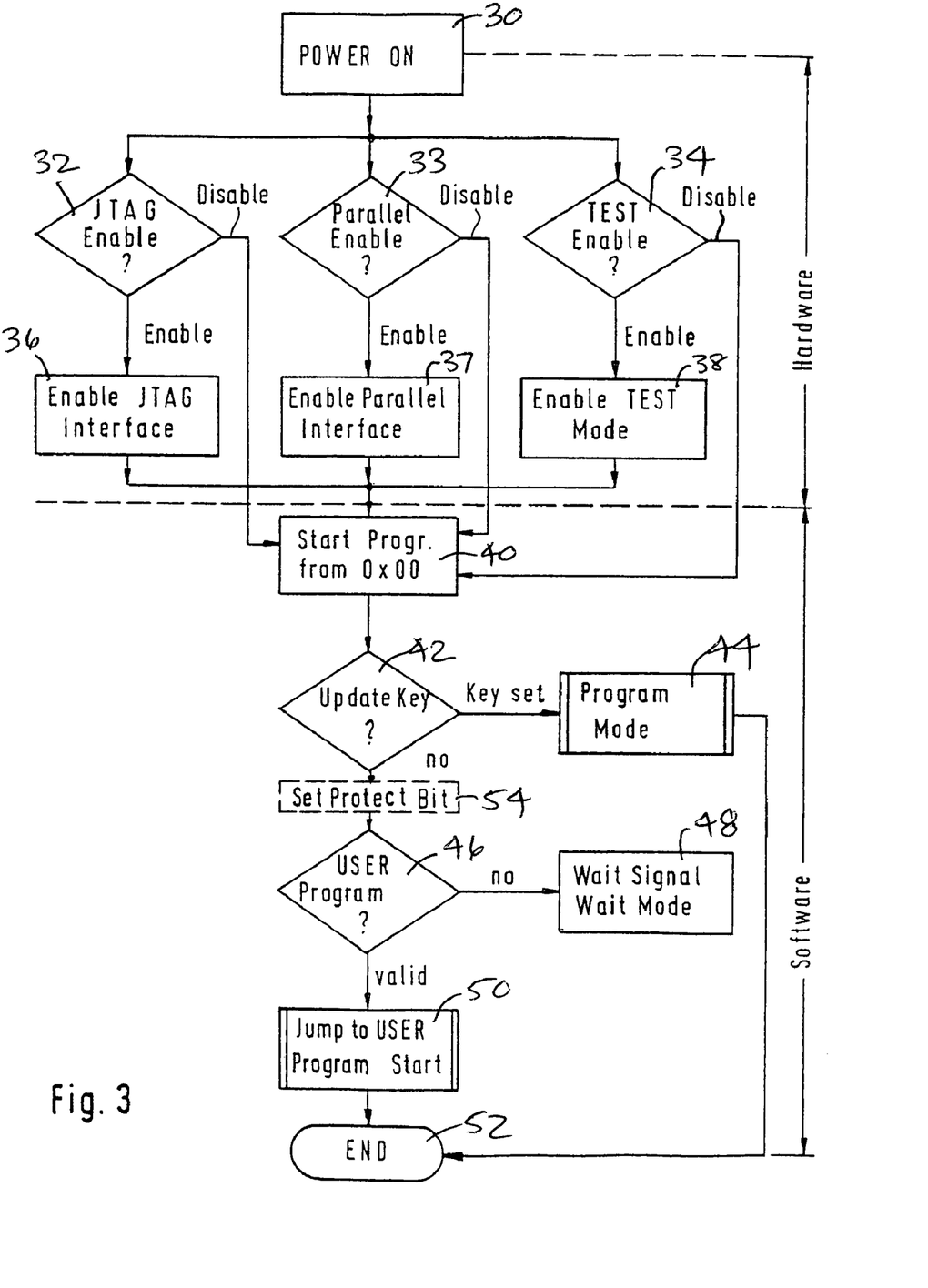
FIG. 3 is a flowchart illustration of an initialization sequence.

FIG. 3 is a flow chart illustration of events occurring when the power is turned on to the processor 100. A power on condition as indicated in the block 30 initiates an interrogation of the individual bit locations 24 in the protection control register 17. In an example of an on-chip flash memory, the logical "1" state corresponds to "enable", and the logical "0" state corresponds to "disable". FIG. 3 illustrates as examples three externally accessible data interfaces: a JTAG interface, a parallel interface, and a TEST interface. If the respective interface is enabled, which is symbolized by a determination made in a respective decisions 32-34 and illustrated in subsequent steps 36-38, then data of the memory device 10 can be read or changed via this corresponding interface. At the end of this read or write operation, the boot program is started in a step 40 at the start address 0x00 in the boot area 12 (FIG. 1). However, if disabling information is read from the PCR register 17 after the power on 30 in step 40, the jump to the boot start address 0x00 will take place immediately and reading from or writing to any portions of the memory device 10 via the interfaces will not be possible. In this manner, the disabling information of the PCR register 17 cannot be bypassed, because this hardware-controlled interrogation takes place as a first step immediately upon turn-on during the first system clock periods. By contrast, the start of the program from the boot memory address 0x00 typically represents a pure software operation.

Next, the program start from the boot start address 0x00 initiates an inquiry as to whether a new user program (e.g., an update) is to be loaded. This can be signaled, for example, by manual operation of an input key (update key) in test 42. If an update is desired (i.e., Key set), a programming mode will be initiated in step 44, which is explained in more detail in the flowchart of FIG. 4. If instead no program update is desired, a check is made in test 46 to see whether a complete and valid user program is contained in the second memory portion 14. If the result of the test 46 is negative (i.e., because the user program is not complete), wait state 48 will be initiated and the current functions will be interrupted. If instead the user program is complete and valid, a jump to the start address adr-U of the user program will be initiated in step 50. The first memory portion 12 with the initialization or program is then exited in step 52. The processor 100 (FIG. 5) is now ready to decrypt, decode, and internally process the contents of the received data. However, transfer of the decrypted data through externally accessible interfaces is typically not possible.

Further protection against unintentional erasure of the entire memory device 10 can be provided by inserting a programmable protection bit (Set Protection Bit) in step 54 in the "no" branch after the update key inquiry 42, because then the user program is still in the initial program segment. This protection bit can be set during the programming of the user program, which then prevents the memory device 10 from being erased in whole or in part as a result of a modification or fault in a currently executing program. This protection bit can only be bypassed by turning the device 10 off and signaling by the input of a new user program via the update key. Whether the protection bit is set or not in this case is left to the discretion of the user who creates and makes available the new user program.

Figure 4:
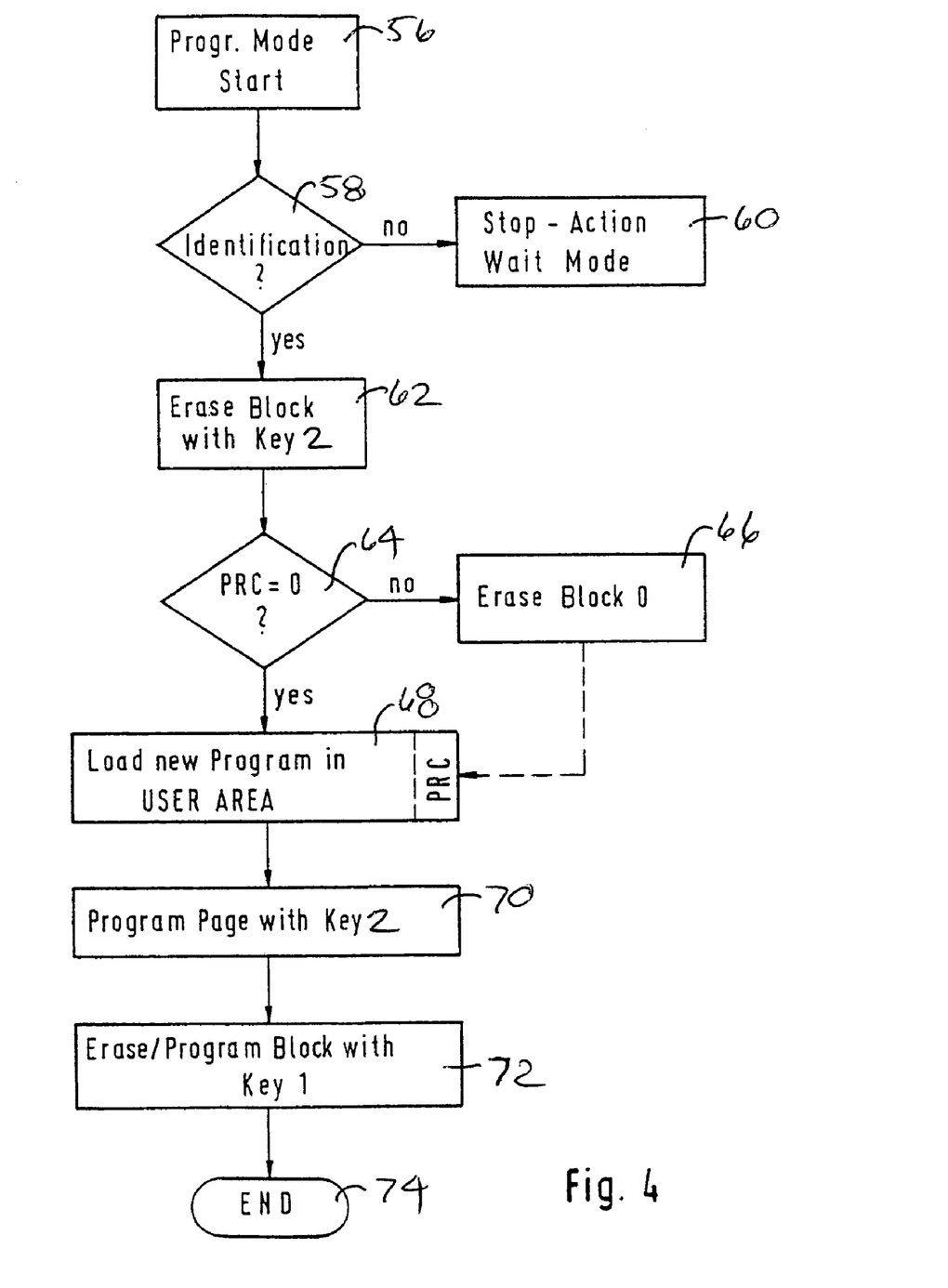
FIG. 4 is a flowchart illustration of a program update.

The flowchart of FIG. 4 illustrates the sequence of events occurring in an update operation of the user program, which is initiated by the programming mode. After an entry step 56, an identification check is made in test 58. If the result of this check is negative, the programming mode will be immediately interrupted and a wait state 60 will be initiated and indicated. If the identification check instead was successful, in a next step 62 the third memory block 20 containing the keyword "Key 2" will be erased. This is followed by an inquiry in test 64 as to whether the protection control register 17 contains a disable bit "0" and whether the new content is also a disable bit. If neither is the case, the PCR register 17 will be erased in step 66. That is, initially those cases are determined in which the contents of the protection control register 17 must be changed or the enabled state is to be retained. In those cases, the PCR register 17 can be erased before the new program is loaded. If this test step 64 shows, however, that the previous content of the protection control register 17 was a disable bit, and the program to be loaded also contains a disable bit, the protection control register 17 will not be erased. This ensures that the disabling information contained in the protection control register 17 does not become ineffective at any time during reprogramming, not even for a relatively short period of time. After the protection control register 17 has received its new contents, the new user program can be loaded into the fourth memory block 22 in step 68. The loading may be preceded by an erasure of the old user program.

It should be noted that throughout the programming of the user program, the password "Key 2" in the third memory block 20 was erased. Decryption of the program took place by the password "Key 1", which is present in the second memory block 18. After the new program has been loaded into the fourth memory block 22 the new password "Key 2" is written by the received program into the third memory block 20 in step 70. As the last step of the reprogramming, the old password "Key 1" in the second memory block 18 is erased in step 72 and replaced by the new password. The reprogramming then ends in step 74.

As shown in the flowchart of FIG. 4, reprogramming begins with the erasure of the password in the third memory block 20 and ends with the erasure and writing of the new password in the second memory block 18. The status of the third and second memory blocks 20, 18 thus permits a statement as to whether the programming of the user program is complete or whether the program was stopped prior to completion. In the latter case, a simple logic comparison of the contents of the second and third memory blocks 18, 20 will show whether the user program is complete and thus valid. If the user program is invalid, the processor 100, will go into a wait mode in the step 48 (FIG. 3), which can only be ended by starting a new program from the user start address adr-U.

A global erasure of the entire contents of the memory device 10 is not illustrated in FIGS. 3 and 4. It can be initiated, for example, by a predetermined configuration of levels at predetermined terminals of the processor 100. This state typically must not occur even under worst-case operating conditions of the processor 100. The global erasure is linked to a completely irregular operating condition. The purpose of the global erasure is to cancel the inhibition by the protection control register 17 under specific conditions without making it possible to read any protected data from the memory device 10. These data have disappeared as a result of the erasure. Reprogramming of the entire memory device 10 is now possible. The programming is somewhat onerous, because the first memory portion 12 still cannot be loaded via data interfaces controlled by the processor 100, but only via interfaces independent of the processor 100. Through the global erasure, processors loaded by mistake with an erroneous or incorrect program can still be used by the manufacturer or user after their inhibition. Third parties having knowledge of the global erasure cannot access the memory contents. The protection function is thus fully preserved.

Referring to FIG. 5, an embodiment of the invention is illustrated with the functional units of the protection function in block-diagram form. The processor 100 includes a processor core 102 whose inputs and outputs are connected to an internal data bus 104 and an internal address bus 106. Since these two buses 104, 106 are not brought out off chip, they may also be designed as high-speed parallel buses each including, for example, thirty-two lines. In addition, there may be less efficient internal bus links that interconnect the individual functional units of the processor 100. The processor 100 is clocked by a system clock signal cl provided on a line 108 by an on-chip clock generator 110.

The data and addresses to be processed in the processor core 102 come either via the data bus 104 or the address bus 106 from a static random-access memory (SRAM) 112, a flash memory which comprises the memory device 10 of FIG. 1, or one of the several data interfaces 114, 116, 118. It is also possible that the data and addresses are provided directly from a data interface (e.g., a JTAG interface 114) to the processor core 102. In the embodiment of FIG. 5, the following externally accessible data interfaces are connected to the data bus 104 and the address bus 106: the JTAG interface 114, the USB interface 116, and the parallel interface 118. The USB data interface 116 cooperates with the processor core 102 via a suitable program controller. The JTAG interface 114 and the parallel interface 118, which are independent of the processor core 102, have more or less convenient data and address inputs.

Memory area signals adr-i are formed from the individual addresses by an address generator 120. In logic devices 122, 124, 126 associated with the interfaces 114, 116 and 118, respectively, these address range signals are combined with the associated disabling or enabling signal from the PCR register 17 to form control signals 128, 130, 132 which disable or enable the respective interfaces 114, 116, 118.

Although the present invention has been shown and described with respect to several preferred embodiments thereof, various changes, omissions and additions to the form and detail thereof, may be made therein, without departing from the spirit and scope of the invention.

What is claimed is:

1. An integrated circuit, comprising:
   a processor;
   a plurality of interfaces that provide external access to the integrated circuit, the plurality of interfaces comprising a USB interface, a JTAG interface and a parallel interface; and
   a non-volatile memory device partitioned into a plurality of memory portions including a first memory portion and a second memory portion, where the first memory portion includes initialization executable program instructions that are executed upon power-up of the integrated circuit, and where the second memory portion includes (i) a first password, (ii) a second password, (iii) program control register data associated with enabling or disabling of the plurality of interfaces, and (iv) executable program instructions for encrypting or decrypting data, where the first and second passwords are associated with access by a user to the executable program instructions;
   where bit locations of the program control register data associated with the plurality of interfaces are hardwired within the integrated circuit with interface control circuitry, such that upon a reset of the processor the bit locations of the program control register data are read by the interface control circuitry to determine which of the plurality of interfaces should be enabled based upon uniquely associated control bits in the program control register data.

2. The memory device of claim 1, where the plurality of interfaces comprises a first group of interfaces that comprise data interfaces that are independent of the processor.

3. The memory device of claim 1, where the plurality of interfaces comprises a second group of interfaces that comprise data interfaces that are both independent of the processor and controllable by the processor.

4. The memory device of claim 1, where the memory device comprises a random access memory device.

5. The memory device of claim 1, where the memory device comprises a flash memory device.

6. The memory device of claim 1, where the first and second memory portions are erasable by global erase information.

7. The memory device of claim 6, where the global erase information can be initiated by a predetermined configuration of levels at predetermined terminals of the processor.

8. The memory device of claim 7, where the predetermined terminals are inaccessible from outside of the memory device.

9. The memory device of claim 1, where one of the first and the second memory portions further comprises a protection control register, where in the event of a program update, disabling information present in the protection control register remains in the protection control register if the program update includes disabling information for the one of the plurality of data interfaces.

10. The memory device of claim 1, where a user program is stored in one of the first and second memory portions.

11. The memory device of claim 10, where the user program stored in one of the first and second memory portions includes a programmable protection bit that prevents erasure of the memory device.

12. An integrated circuit, comprising:
a processor;
a plurality of interfaces that provide external access to the integrated circuit; and
a non-volatile memory device partitioned into a plurality of memory portions including a first memory portion and a second memory portion, where the first memory portion includes initialization executable program instructions that are executed upon power-up of the integrated circuit, and where the second memory portion includes (i) a first password, (ii) a second password, (iii) program control register data associated with enabling or disabling of the plurality of interfaces and (iv) executable program instructions for encrypting or decrypting data, where the first and second passwords are associated with access by a user to the executable program instructions;
where bit locations of the program control register data associated with the plurality of interfaces are hardwired within the integrated circuit with interface control circuitry, such that upon a reset of the processor the bit locations of the program control register data are input to the interface control circuitry to determine which of the plurality of interfaces should be enabled based upon uniquely associated control bits in the program control register data.

13. The memory device of claim 12, where one of the plurality of first interfaces is independent of the processor.

14. The memory device of claim 12, where the first memory portion stores an initialization program.

15. The memory device of claim 12, where the second memory portion stores a user program that is selectively updatable.

16. An integrated circuit, comprising:
a processor;
a plurality of interfaces in communication with the processor, the plurality of interfaces providing external access to the integrated circuit; and
a non-volatile memory partitioned into a plurality of memory portions including a first memory portion and a second memory portion, the first memory portion including initialization executable program instructions executable upon power-up of the integrated circuit, the second memory portion including
a first password;
a second password, where each of the first and the second passwords have a first type of access and are associated with user access to the executable program instructions;
program control register data associated with enabling or disabling of the plurality of interfaces; and
executable program instructions associated with encrypting or decrypting data;
where bit locations of the program control register data associated with the plurality of interfaces are hardwired within the integrated circuit with interface control circuitry, such that upon a reset of the processor the bit locations of the program control register data are read by the interface control circuitry to determine which of the plurality of interfaces should be enabled based upon uniquely associated control bits in the program control register data.

* * * * *